United States Patent
Jensen

(12)
(10) Patent No.: US 6,676,347 B2
(45) Date of Patent: *Jan. 13, 2004

(54) BLIND FASTENER AND DRIVE NUT ASSEMBLY

(75) Inventor: Carl Brian Jensen, Torrance, CA (US)

(73) Assignee: Huck Patents, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/196,579

(22) Filed: Jul. 16, 2002

(65) Prior Publication Data

US 2002/0176760 A1 Nov. 28, 2002

Related U.S. Application Data

(63) Continuation-in-part of application No. 09/997,500, filed on Nov. 19, 2001, which is a continuation-in-part of application No. 09/849,184, filed on May 4, 2001, which is a continuation-in-part of application No. 09/825,711, filed on Apr. 4, 2001
(60) Provisional application No. 60/232,336, filed on Sep. 13, 2000.

(51) Int. Cl.[7] ................................................. F16B 13/04
(52) U.S. Cl. .............................. 411/43; 411/34; 411/55; 411/437; 411/284
(58) Field of Search ...................... 411/34–38, 43, 411/45, 55, 70, 437, 283, 284

(56) References Cited

U.S. PATENT DOCUMENTS

| | | |
|---|---|---|
| 206,566 A | 7/1878 | Hemelright |
| 672,217 A | 4/1901 | Noyes |
| 1,551,381 A | 8/1925 | Foss |
| 1,558,447 A | 10/1925 | Beach |
| 2,099,678 A | 11/1937 | Curtis |
| 2,282,711 A | 5/1942 | Eklund |
| 2,358,249 A | 9/1944 | Portuondo |
| 2,670,021 A | 2/1954 | Torresen et al. |
| 2,884,099 A | 4/1959 | Nenzell |
| 2,915,934 A | 12/1959 | La Torre |
| 2,974,558 A | 3/1961 | Hodell |
| 3,236,143 A | 2/1966 | Wing |
| 3,253,495 A | 5/1966 | Orloff |
| 3,276,308 A | 10/1966 | Bergere |
| 3,283,639 A | * 11/1966 | Holton |
| 3,302,510 A | 2/1967 | Gapp |
| 3,357,094 A | 12/1967 | Mouck |
| 3,643,544 A | 2/1972 | Massa |
| 3,653,294 A | 4/1972 | Nason |
| 3,657,956 A | 4/1972 | Bradley et al. |
| 3,821,975 A | 7/1974 | Haker |
| 4,012,984 A | 3/1977 | Matuschek |

(List continued on next page.)

*Primary Examiner*—Flemming Saether
(74) *Attorney, Agent, or Firm*—Christie, Parker & Hale, LLP

(57) ABSTRACT

A blind fastener with an improved drive nut and assembly process. The blind fastener includes a screw, a sleeve, a nut, and a drive nut. The drive nut has a smooth bore and protruding nibs that mate precisely with a driving recess located in the nut head. A side portion of the drive nut is deformed to retain the drive nut on the screw against the nut. Once the new assembly process for the blind fastener has been completed, the drive nut will have been mated with the nut head to prevent any rotation of the nut during installation of the blind fastener. The assembly process includes placing the sleeve over the threads of the screw to a position adjacent the screw head. The nut is then threaded onto the screw adjacent the sleeve. The protruding nibs of the drive nut are next aligned and physically engaged into the driving recess of the nut head by sliding the smooth bore over the screw. At least one side portion of the drive nut is deformed by side staking thereby displacing a portion of the drive nut into the threads of the screw.

8 Claims, 13 Drawing Sheets

U.S. PATENT DOCUMENTS

| | | |
|---|---|---|
| 4,089,247 A | 5/1978 | Dahl et al. |
| 4,230,017 A | 10/1980 | Angelosanto |
| 4,370,081 A | 1/1983 | Briles |
| 4,376,604 A | 3/1983 | Pratt et al. |
| 4,457,652 A | 7/1984 | Pratt |
| 4,499,647 A | 2/1985 | Sakamura et al. |
| 4,557,649 A | 12/1985 | Jeal |
| 4,714,391 A | 12/1987 | Bergner |
| 4,747,204 A | 5/1988 | Pratt et al. |
| 4,752,169 A | 6/1988 | Pratt |
| 4,772,167 A | 9/1988 | Beals |
| 4,778,318 A * | 10/1988 | Jeal |
| 4,877,363 A | 10/1989 | Williamson |
| 4,919,577 A | 4/1990 | Binns |
| 4,946,325 A | 8/1990 | Abraham |
| 4,967,463 A | 11/1990 | Pratt |
| 5,123,792 A | 6/1992 | Strobel |
| 5,216,941 A | 6/1993 | Kolvereid |
| 5,862,725 A | 1/1999 | Negus |
| 6,012,358 A | 1/2000 | Lins et al. |
| 6,116,833 A * | 9/2000 | Ellis |

* cited by examiner

BLIND FASTENER AND DRIVE NUT ASSEMBLY

CROSS-REFERENCE TO RELATED APPLICATION(S)

This application is a continuation-in-part of U.S. patent application Ser. No. 09/997,500 filed Nov. 19, 2001, which is a continuation-in-part of U.S. patent application Ser. No. 09/849,184 filed May 4, 2001, which is a continuation-in-part of U.S. patent application Ser. No. 09/825,711 filed Apr. 4, 2001, which claims priority from Provisional application No. 60/232,336 filed Sep. 13, 2000.

BACKGROUND OF THE INVENTION

This invention relates to blind fasteners for securing panels and sheet material together, and more particularly, to an improved drive nut design for retaining the drive nut to a screw.

Blind fasteners are commonly used to secure two sheets together when it is otherwise impossible to access the underside (blind side) surface of one of the sheets. Such fasteners have wide application in aircraft and space vehicle assembly. Due to the vibrations and sonic fatigue encountered in these environments, it is necessary to create a fastener of enduring strength and reliability.

The previously available blind fastener that this invention improves upon comprises: (1) a screw, (2) a sleeve, (3) a nut, and (4) a drive nut. Examples of the previously available blind fasteners are disclosed in U.S. Pat. Nos. 4,772,167 and 4,747,202. Generally, the screw has an externally threaded surface that allows the sleeve, the nut, and the drive nut, which are each internally threaded, to be placed onto the screw. The blind fastener is inserted into aligned apertures of the sheets that are being secured together, and after installation is complete the sleeve and the nut will clamp the sheets together.

The screw has the shape of a long threaded bolt with an enlarged head at one end of the screw, and at the end opposite of the head is two machined flats. The machined flats are wrenching surfaces that allow a tool to rotate the screw during assembly and installation of the blind fastener. The screw also has a frangible groove at a predescribed position on the threaded section that is machined to a diameter smaller than the minor diameter of the external thread. The purpose of this frangible groove is to prevent over torquing and/or excessive upsetting of the sleeve during installation by serving as a breakneck. When a certain installation load is achieved, the frangible groove prevents overloading by failing first in torsional shear and then breaking away from the assembly.

The sleeve has a cylindrical shape and is made of a malleable material. The purpose of the sleeve is to expand radially and abut against the blind side surface of the sheet during installation. The nut has a cylindrical shape and resembles a flush head or protruding head bolt, with the exceptions that it is internally threaded throughout, and on the top of the head has a driving recess. Further, the nut is dimpled around its diameter in such a manner as to provide friction on the screw to prevent unloosening of the screw once the fastener is installed.

The driving nut resembles a traditional hexagon nut and has the same internal threading as the nut. On one end of the drive nut is a chamfered angle that begins from the external hexagon shape and ends at a predetermined counterbore that is larger than the internal thread diameter. Further, the drive nut has an annular ridge that is made of a malleable material that allows deformation of the annular ridge into the head and the recess of the nut.

The assembly process of the previously available blind fastener consists of the sleeve being placed over the screw until it abuts the head of the screw, followed by the nut being threaded onto the screw until it is seated against the sleeve. The nut is then dimpled on the outer wall by a physical deformation process that places some of the nut material against the internal screw to prevent loosening. The drive nut is then threaded onto the screw until it is seated against the head of the nut. The installation process of the blind fastener is accomplished by use of a tool adapted to hold the drive nut stationary and simultaneously fit over the machined flats on the screw. The tool prevents the drive nut from rotating, while at the same time rotates the screw. As the screw rotates, the sleeve is pulled towards the blind side of the sheet material. The malleable sleeve then abuts the sheet material and begins to deform into an expanded diameter. Meanwhile, at the opposite end of the blind fastener assembly, the annular ridge of the drive nut begins to deform and flatten against the nut head. As the torsional and compressive load increases, the annular ridge of the deformable drive nut begins to rotate as much as 180° degrees before it penetrates the recess of the head of the nut which is evidenced by head marking and material smearing.

The drive nut behaves as a "jam nut" by forcibly deforming against the nut head to prevent the nut from rotating. At a certain torsional and compressive load the screw stops rotating and the breakneck frangible groove fails, causing the drive nut and remaining screw to fall away.

The problems with the presently available blind fastener derive from the deformable drive nut. Optimum installation performance and reliability are not achieved from the blind fastener because the deformable drive nut allows undesired rotation and "jam nut effect". The deformable drive nut rotates upon the head of the nut as the annular ridge of the drive nut deforms into the recess of the nut head. This deformation process causes rotation of the nut and smearing or scraping of the nut head. This result is not only visually apparent, but can also deteriorate the nut's corrosion resisting properties and damage the plating under the head and grip area of the nut. Finally, the "jam nut effect" of the deformable drive nut causes large variations in the required installation loads. This can result in premature screw break off and inconsistencies in the amount of sleeve material that deforms into an expanded diameter, thus compromising the integrity of the blind fastener.

Consequently, a need exists for a blind fastener with a non-deformable drive nut that has positive engagement into the head of the nut thereby eliminating rotation of the nut and all of the problems associated with undesired rotation and "jam nut effect".

SUMMARY OF THE INVENTION

The present invention is directed to a blind fastener with an improved drive nut and assembly process. The blind fastener of the present invention includes a screw, a sleeve, a nut, and a drive nut. The screw, the sleeve, and the nut of this blind fastener are similar to those of the previously available blind fastener discussed above. The improvements of the present invention relate to a new structure for the drive nut and a new assembly process for the blind fastener. The new drive nut and assembly process significantly improve the reliability of the blind fastener by eliminating the inconsistencies associated with forcibly deforming the drive nut into the head of the nut.

The new drive nut of this invention has protruding nibs that mate precisely with a recess located in the nut head. The protruding nibs of the new drive nut are not deformable and serve to replace the deformable annular ridge that was used in previous drive nut assemblies. The configuration of the protruding nibs and the recess in the nut head can be of many forms, so long as both parts are capable of being mated. The protruding nibs are fabricated at one end of the drive nut and are perfectly engaged to resist any installation torsional loading. The drive nut can have an internally threaded bore to matingly engage the screw, or in an alternative configuration can have a smooth bore for placement over the screw. For smooth bore configurations the drive nut is held in place on the screw by a retaining ring, insert or plug positioned on the drive nut opposite the protruding nibs. Alternatively the drive nut can be held onto the screw by an adhesive. Yet another alternative for retaining the drive nut with a smooth bore onto the screw is by staking a small portion of the drive nut into the threads on the screw. Once the new assembly process for the blind fastener has been completed, the drive nut will have been mated with the nut head to prevent any rotation of the nut during installation of the blind fastener into the sheets being secured.

The assembly process of the blind fastener comprising the new drive nut also differs from that previously utilized. The assembly process will now include placing the sleeve over the threads of the screw to a position adjacent the screw head. The nut is then partially threaded onto the screw until the internal threads within the region of the enlarged nut head have not been completely threaded onto the screw. For an internally threaded drive nut, the drive nut's protruding nibs are next aligned and physically engaged into the mating recess in the nut head. The mated drive nut and nut are next rotated which results in the drive nut and nut being physically locked together and being threaded onto the screw as a single unit. Once the nut is adjacent to the sleeve, the assembly is completed by positioning the screw, the sleeve, the nut, and the drive nut so the nut can be dimpled. The dimpling process places a small physical deformation on an outer surface of the nut which displaces a small portion of the nut material against the internal screw to cause sufficient friction to prevent loosening.

For a smooth bore drive nut, the nut is threaded all the way onto the screw adjacent the sleeve. The drive nut is then slid over the screw until the nibs engage the recess in the head of the nut. The drive nut is held in place by placing the retaining ring, insert or plug on the backside of the nut, or alternatively by applying on adhesive into the smooth bore. Yet alternatively, the drive nut is held onto the screw by staking an end portion of the drive nut into the threads of the screw by a hollow mandrel. The drive nut can alternatively be staked onto the screw on one or more locations along the side of the drive nut.

Once the new assembly process is complete, the blind fastener having the new drive nut is installed into the sheets to be secured by means similar to those used with the previously disclosed blind fastener. Namely, a tool with a means for holding the drive nut stationary, and at the same time rotating the screw, is used to cause the sleeve to deform against the blind side surface of the sheet and secure the sheets between the nut and the sleeve.

As the sleeve deforms against the blind side of a sheet during installation, the drive nut will not deform into the nut head. The mating connection between the drive nut and nut head prevents smearing and scraping of the nut head and preserves its corrosion resistant properties. Unlike the previously available drive nut having a deformable annular ridge, the drive nut of this invention has no "jam nut effect". The protruding nibs on the drive nut eliminates the unpredictability of installation loads placed on the screw by not forcibly deforming against the nut head. This in turn greatly reduces the risk of premature screw break off and increases consistency in the amount of sleeve material that will be deformed against the sheet. These new drive nut designs improve the consistency of loading by at least 30 percent or more. This relates to a significant improvement in reliability of the installation process and reduces variability.

Other objects, features and advantages of the invention will be apparent from the following detailed description taken in connection with the accompanying drawings.

BRIEF DESCRIPTION OF THE DRAWINGS

FIG. 7b is a partial cross-sectional side view of the nut of FIG. 7a;

FIG. 8b is a partial cross-sectional side view of the nut of FIG. 8a;

DETAILED DESCRIPTION OF THE INVENTION

Figure 4:
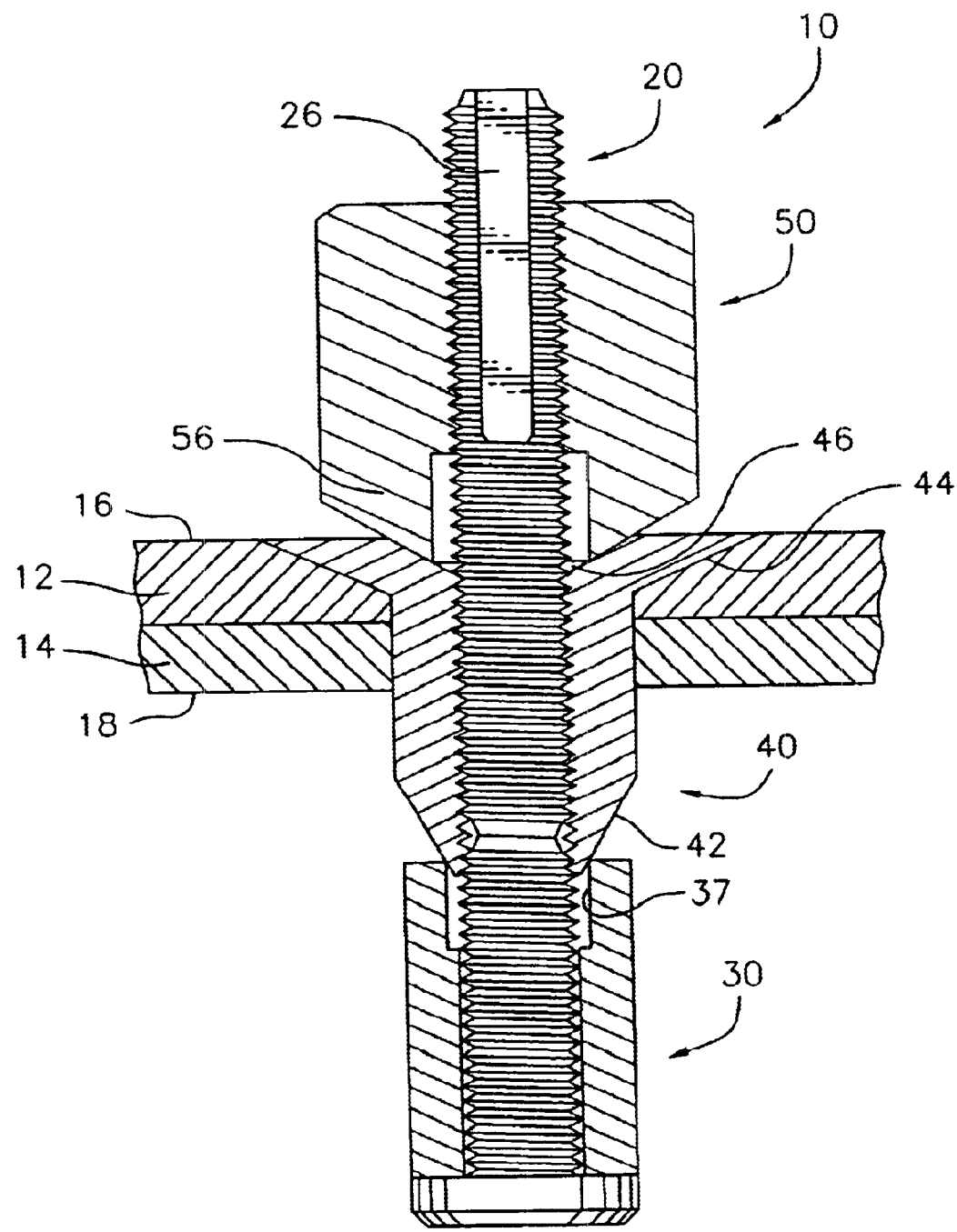
FIG. 4 is a partial cross-sectional side view of the blind fastener system of FIG. 1 showing the blind fastener during installation into a pair of sheets.

The present invention is embodied in a blind fastener 10, for use in connecting two or more panels or sheet materials together. Typically, the sheets are made of materials commonly used in the aerospace industry including aluminum or other composite materials. As shown in FIG. 4, the blind fastener 10 is designed to create a clamping force thereby holding sheets 12 and 14 together. The blind fastener 10 is particularly useful in the assembly of aircraft and space vehicles where access to the inaccessible or "blind" surface 18 of sheet 14 is not possible.

Figure 1:
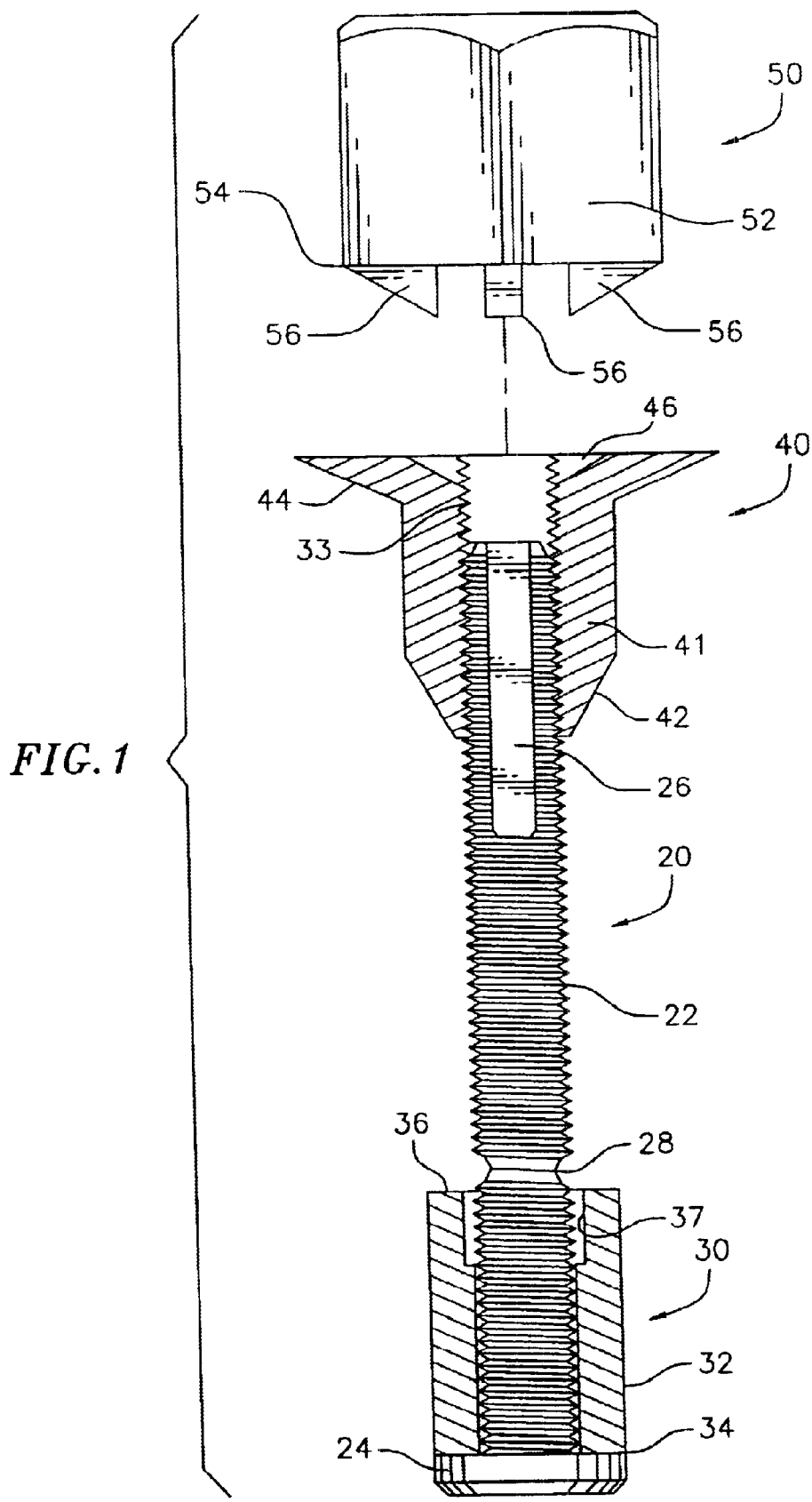
FIG. 1 is a partial cross-sectional side view of a first embodiment blind fastener system of the present invention.

Referring to FIG. 1, the blind fastener 10 includes a screw 20, a sleeve 30, a nut 40, and a drive nut 50. Generally, the screw 20 has external threads 22 which allow the sleeve 30, the nut 40, and the drive nut 50 to be placed onto the screw 20. At this point, the blind fastener 10 is assembled and installed into the sheets 12 and 14, which each have apertures of a diameter large enough to allow insertion of the blind fastener 10 into the sheets.

The screw 20 has the shape of a long threaded bolt with external threads 22 and an enlarged head 24. At the end opposite of the enlarged head 24 is two machined flats 26 which provide wrenching surfaces that allow a driving tool (not shown) to engage the machined flats 26 and apply torque resulting in rotary movement of the screw 20. In one embodiment, the enlarged screw head 24 is sized to have a diameter that matches the diameter of the sleeve 30, measured from the outer surfaces of the sleeve body 32.

The nut and the drive nut are each internally threaded and have identical internal threads 33. The internal threads 33 are sized to threadingly cooperate with the external threads 22 of the screw 20. This allows the nut, and the drive nut to be positioned over the screw 20.

The screw 20 also includes a frangible groove 28. The frangible groove 28 is located at predescribed position on the threaded section of the screw 20 and is machined to a diameter smaller than the minor diameter of the external threads 22. The frangible groove 28 serves as a breakneck that will fail in torsional shear and break away from the blind fastener 10 when a certain torsional load is achieved. This breakneck function of the frangible groove 28 prevents over torquing and/or excessive upsetting of the sleeve during installation. In a preferred embodiment, the frangible groove 28 is machined at an axial position on the screw 20 so that when the frangible groove 28 breaks away the remaining portion of the screw 20 extending from head 24 will be substantially flush with a top surface 43 of the nut head 44.

The sleeve 30 has a cylindrical shape and is made of a malleable material. The sleeve 30 is placed onto the screw 20 until the sleeve end 34 abuts the screw head 24. The sleeve face 36 is designed to deform when the screw 20 is rotated and the nut 40 is drawn towards the sleeve 30. A tapered nose 42 of the nut 40 presses against the internal diameter of sleeve face 37 with such force that the sleeve body causes internal diameter 37 to radially expand and ultimately buckle as it slides over tapered nose 42. Continued loading causes the sleeve body 32 to increase in diameter and adjoin the blind inner surface 18 of sheet 14, thereby securing sheets 12 and 14 together between the sleeve 30 and the head 44 of the nut 40.

Figure 2:
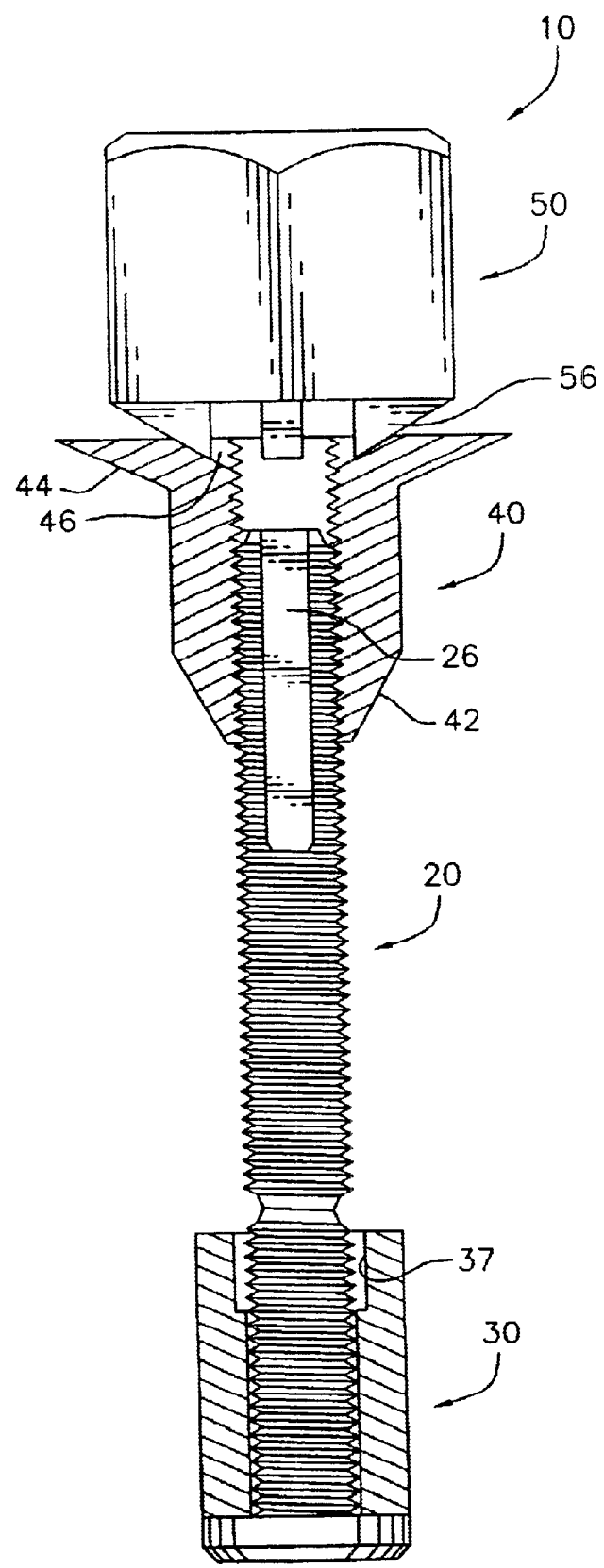
FIG. 2 is a partial cross-sectional side view of the blind fastener system of FIG. 1 shown the drive nut engaged in the driving recess of the nut.

The nut 40 has a cylindrical shape and preferably resembles a flush head bolt. The nut 40 includes a nut body 41, the tapered nose 42 that is located at one end of the nut body, and a nut head 44 located at an end opposite the tapered nose 42. The nut body 41 preferably has an outer diameter substantially the same as the outer diameter of the sleeve body 32. The tapered nose 42 projects inwardly and has a diameter that is smaller than the diameter of the nut body 41. The tapered nose 42 abuts the sleeve internal diameter 37 when it is positioned on the screw 20. As shown in FIG. 2, the nut head 44 contains a driving recess 46 that allows the drive nut 50 to be matingly engaged with the nut 40.

Figure 7A:
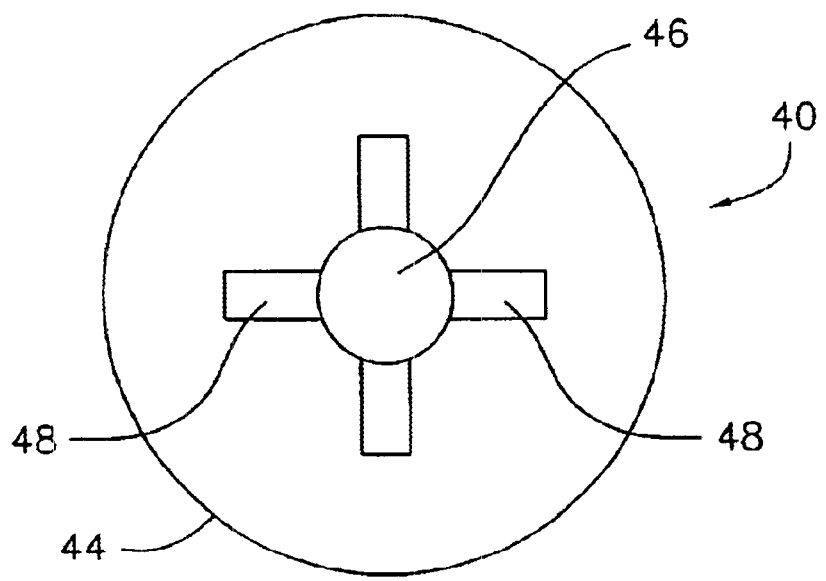
FIG. 7a is a top view of the nut of the blind fastener system of FIG. 1, showing the driving recess in a cross-slot configuration.
Figure 7B:
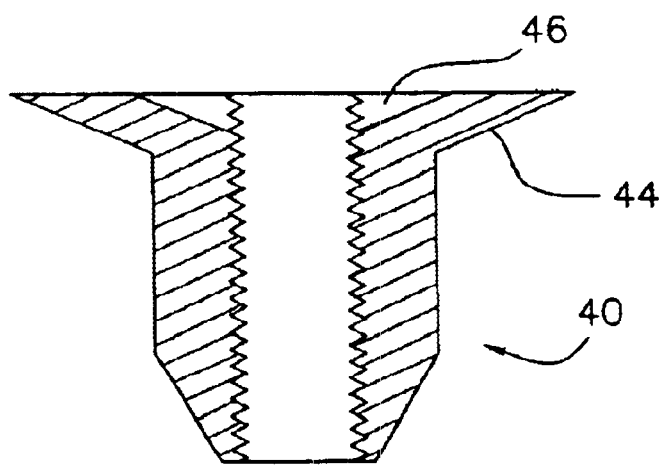
Figure 8A:
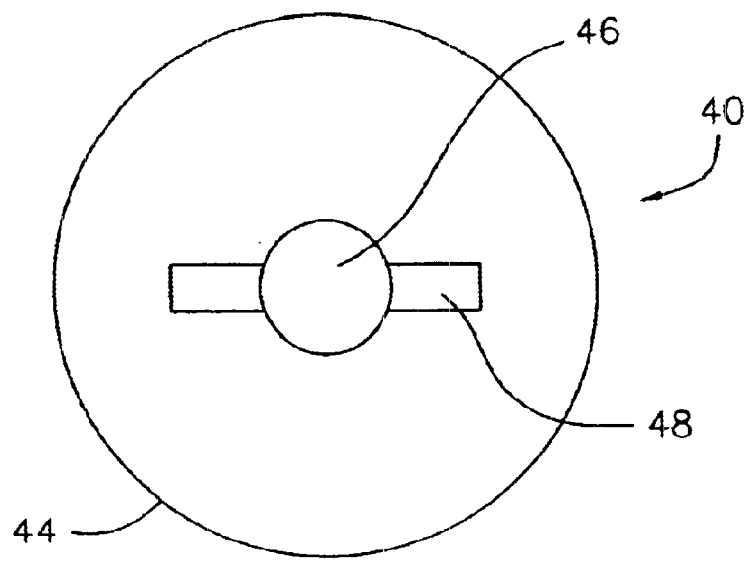
FIG. 8a is a top view of the nut of the blind fastener system of FIG. 1, showing the driving recess in a single slot configuration.
Figure 8B:
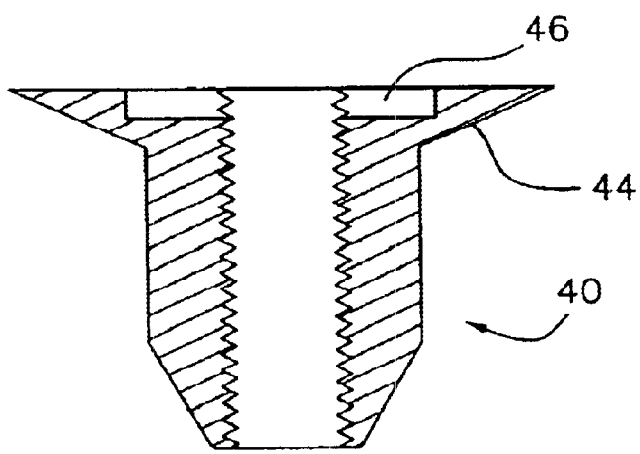

As shown in FIGS. 7a and 7b, the driving recess 46 of the nut head 44 comprises a plurality of indentations 48. The indentations 48 in the driving recess 46 can be formed in any configuration that allows the nut head 44 and drive nut 50 to be matingly engaged, and thereby prevent rotation of the nut 40 and drive nut 50 during installation of the blind fastener 10. In a preferred embodiment, as shown in FIG. 7a, the indentations 48 are in a cross-slot configuration, and accordingly the drive nut 50 must have protruding nibs 56 in a cross-slot configuration. The indentations 48 of the driving recess 46 can alternatively have a single slot configuration, as shown in FIGS. 8a and 8b, or any other configuration such as the shape of a hexagon or square, as long as the nibs 56 of the drive nut 50 have a matching configuration.

Figure 9A:
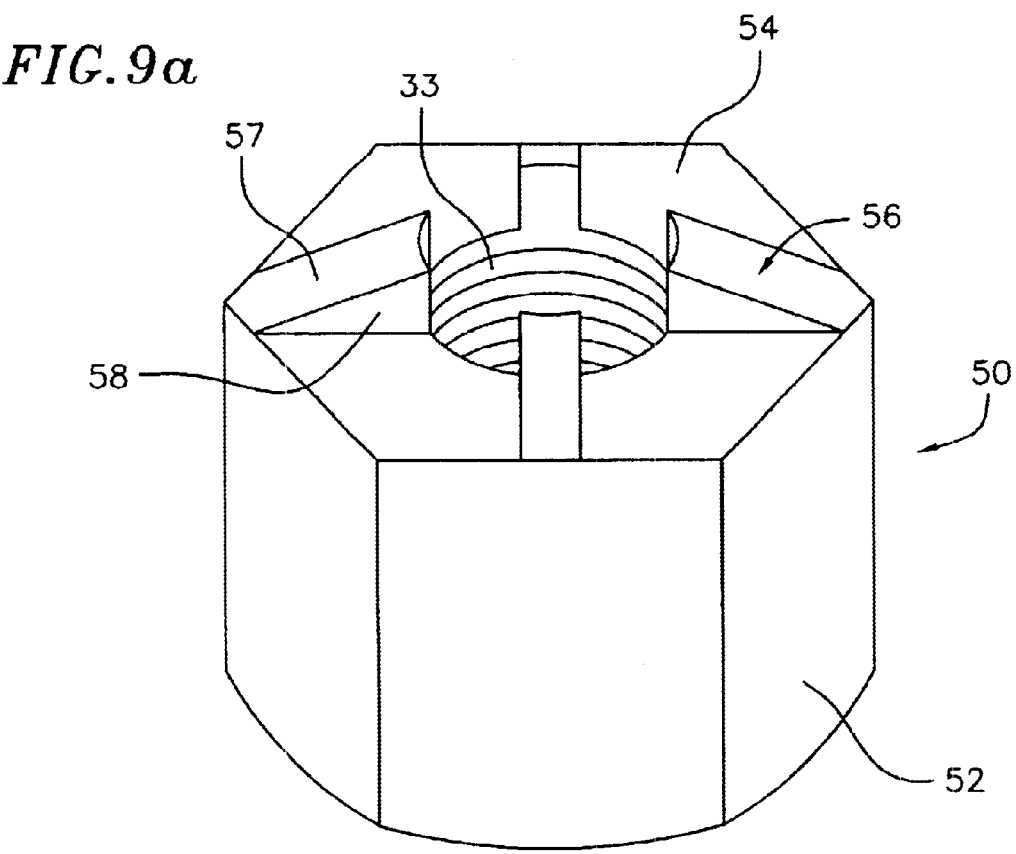
FIG. 9a is a perspective view of the drive nut of the blind fastener system of FIG. 1, showing four nibs having an angled engaging surface.
Figure 9B:
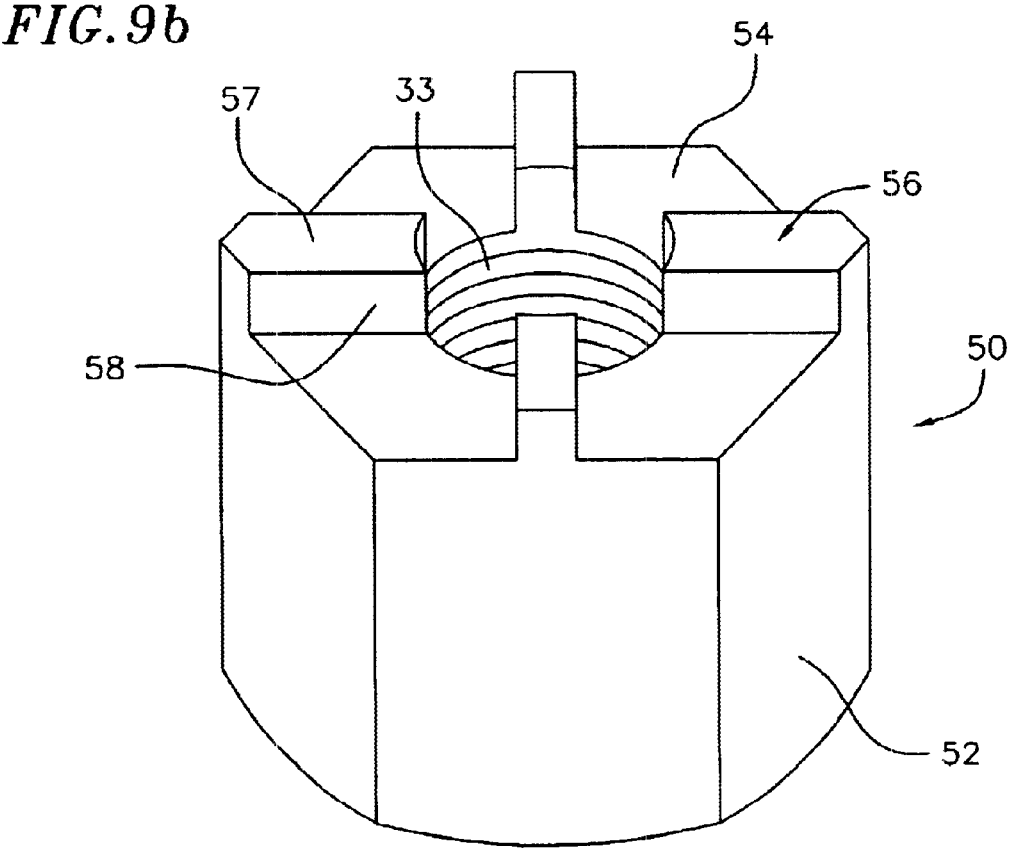
FIG. 9b is a perspective view of the drive nut of the blind fastener system of FIG. 1, showing four nibs having a flat engaging surface.

As shown in FIGS. 9a and 9b, the drive nut 50 preferably has the shape of a traditional hexagon nut and has the same internal threads 33 as nut 40. The drive nut 50 has an outer surface 52 for engagement by a driving tool (not shown) that prevents rotation of the drive nut. The drive nut 50 has a plurality of protruding nibs 56 that provide a positive mechanical engagement with the nut head 44. As discussed above, the nibs 56 are configured to mate precisely with the indentations 48 which comprise the driving recess 46 of the nut head.

Figure 10A:
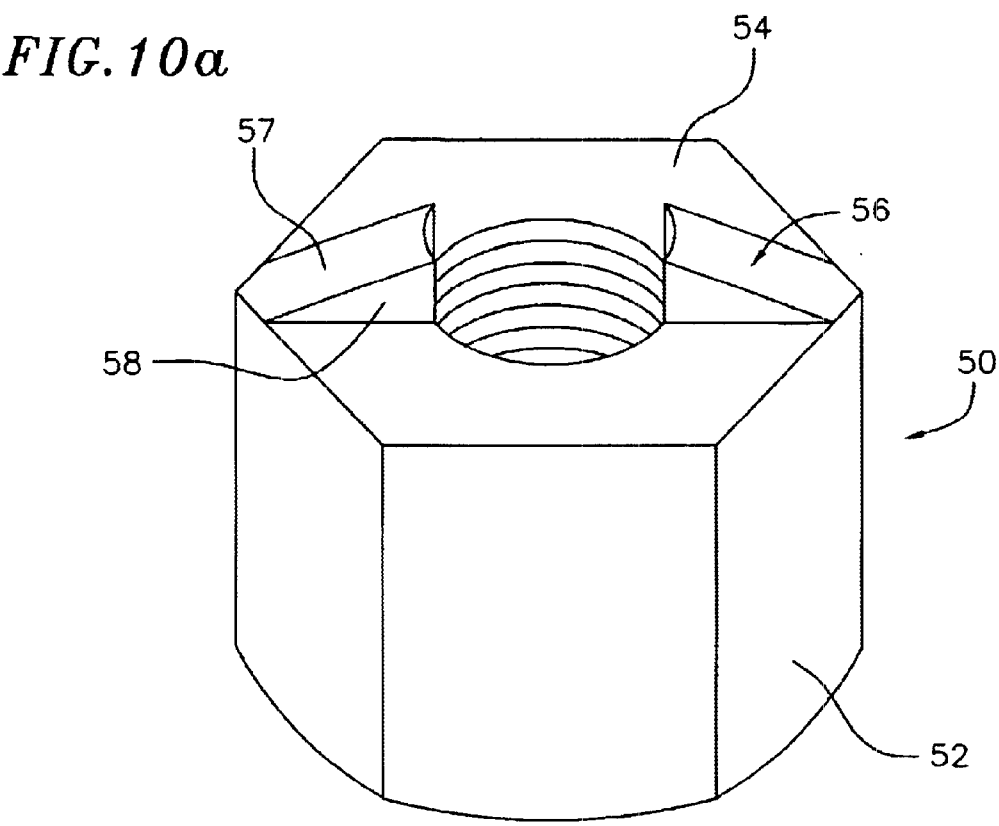
FIG. 10a is a perspective view of the drive nut of the blind fastener system of FIG. 1, showing two nibs having an angled engaging surface.
Figure 10B:
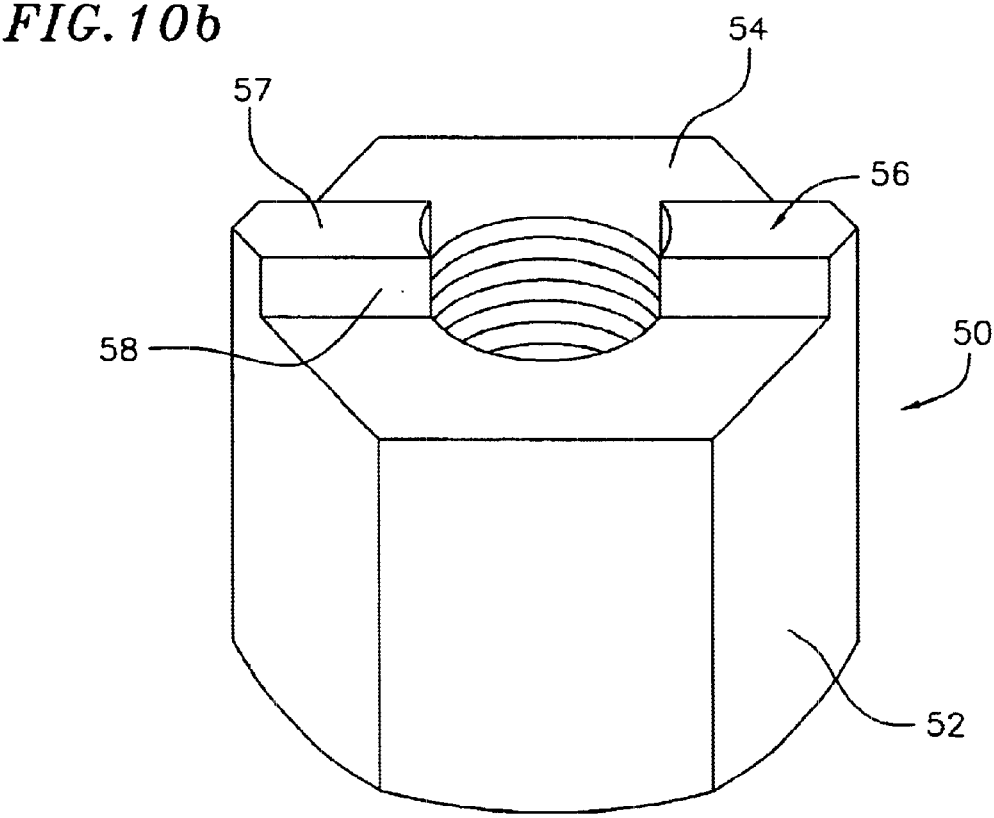
FIG. 10b is a perspective view of the drive nut of the blind fastener system of FIG. 1, showing two nibs having a flat engaging surface.

The nibs 56 are made of a non-deformable material, such that the nibs 56 will not deform during installation of the blind fastener. As with the indentations 48 of the nut 40, the number of nibs 56 on the driving nut 50 can vary and can be in many different geometrical shapes and forms. In a preferred embodiment, as shown in FIGS. 9a and 9b, four nibs 56 are present on the driving nut and each nib has a substantially rectangular shape with an engaging surface 57 and a driving surface 58. In FIG. 9a, the engaging surface 57 is angled relative to the driving surface 58, while in FIG. 9b the engaging surface 57 is flat. Additionally, as shown in FIGS. 10a and 10b, the drive nut 50 can be formed with two nibs 56, and with either an angled engaging surface, as shown in FIG. 10a, or with a flat engaging surface as shown in FIG. 10b. Preferably, the nibs 56 protrude from the drive nut face 54 comprising a rectangular shape with a length equal to the distance between the outer surface 52 and the internal threads 33.

Figure 3:
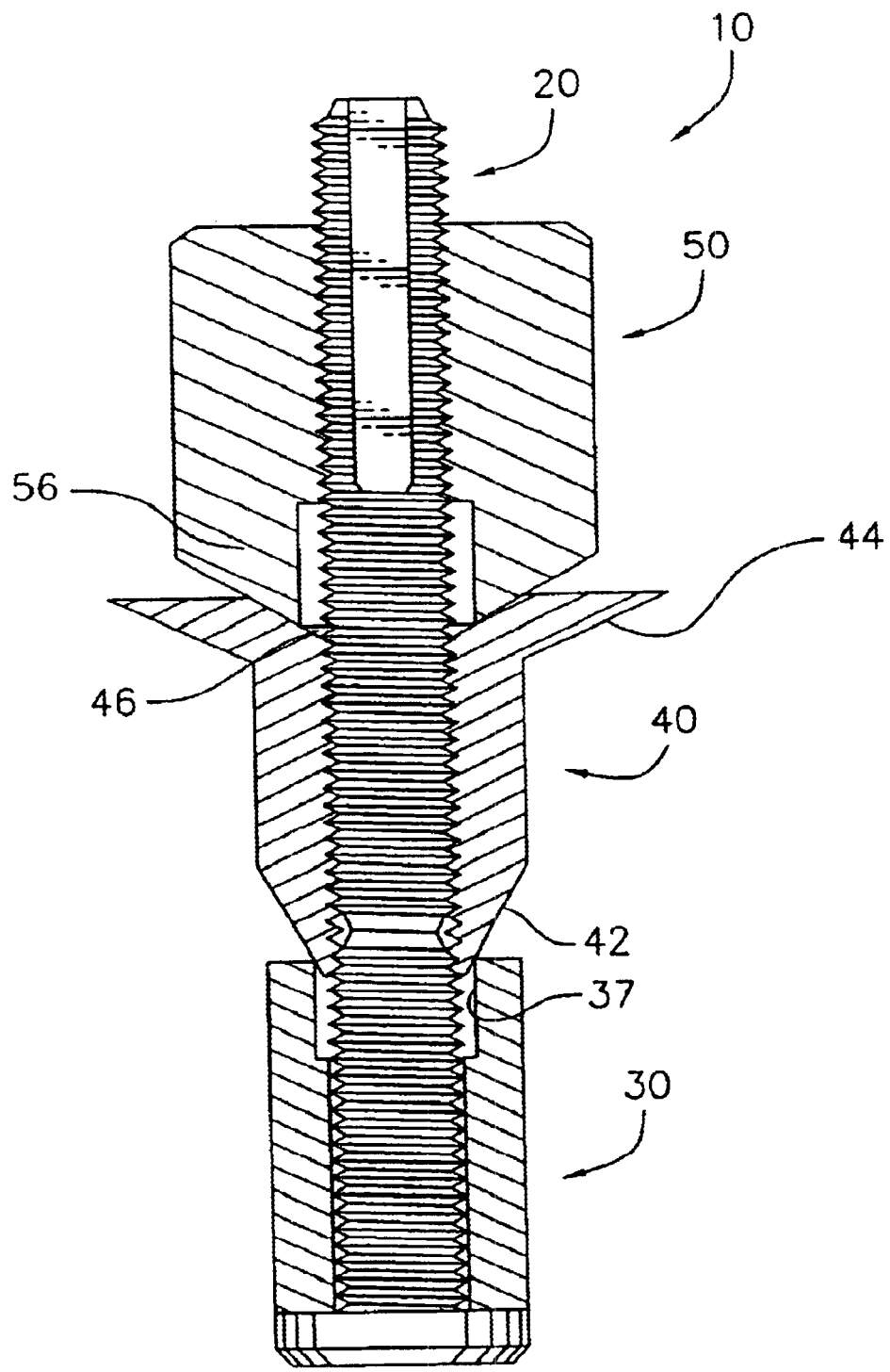
FIG. 3 is a partial cross-sectional side view of the blind fastener system of FIG. 1 showing the blind fastener after assembly is complete.

Prior to installing the blind fastener 10 into the sheets 12, 14, the blind fastener is assembled. Referring to FIGS. 1 to 3, the assembly process comprises a series of steps which result in the sleeve 30, being placed over the screw and the nut 40 and the drive nut 50 being threaded onto the screw 20. First, as shown in FIG. 1, the sleeve 30 is placed over the external screw threads 22 until the sleeve end 34 is adjacent to the screw head 24. Next, the nut 40 is partially threaded onto the screw 20 with the tapered nose 42 directed towards the sleeve face 36 and the internal diameter 37. The nut 40 is preferably threaded onto the screw until the internal threads 33 within the region of the nut head 44 have not been completely threaded over the screw. Specifically, the driving recess 46 of the nut would not be placed over screw at this point. Next, referring to FIG. 2, the drive nut 50 is positioned so that the protruding nibs 56 are aligned and physically engaged into the driving recess 46 of the nut 40. At this point, the drive nut 50 and nut 40 are in mating engagement wherein the engaging surfaces 57 and driving surfaces 58 of the nibs 56 are within the indentations 48 of the driving recess 46. Next, the mated drive nut 50 and nut 40 are rotated which results in the drive nut and nut being threaded onto the screw as a single unit. Once the drive nut 50 has been partially threaded onto the screw 20, the drive nut and nut are physically locked together. Next, as shown in FIG. 3, the drive nut 50 and nut 40 are threaded onto the screw 20 until the tapered nose 42 of the nut is abutting the internal diameter 37. Next, the nut 40 preferably undergoes a dimpling process wherein a small portion of an outer surface of the nut body 41 is physically deformed against the screw 20 (not shown). The dimpling process results in a small portion of the nut 40 material being displaced against the screw 20 to cause sufficient friction to prevent loosening. The assembly process of the blind fastener 10 is then complete and the blind fastener is prepared for installation.

The installation of the assembled blind fastener 10 involves the blind fastener 10 being used to secure a plurality of sheets or panels together. As shown in FIG. 4, a preferred installation involves two sheets 12 and 14 being secured. The blind fastener 10 is inserted into the sheets 12, 14 wherein the nut head 44 is received against the accessible outer surface 16 of sheet 12, and the sleeve 30 extends through the sheets 12, 14 and is adjacent to the inaccessible "blind" surface 18 of sheet 14.

An installation tool (not shown) is adapted to simultaneously have fitting engagement with both the drive nut 50 and the machined flats 26 of the screw 20. The installation tool is placed onto the drive nut 50 and creates an engagement that prevents the drive nut 50 from rotating. Accordingly, the nut 40 is also prevented from rotating because the drive nut 50 and the nut 40 are in mating engagement. The installation tool also engages the machined flats 26 of the screw 20 and provides a rotational torque on the screw 20.

As the installation tool rotates the screw 20 and holds the drive nut 50 and nut 40 stationary, it is significant to note that there is no smearing or scrapping of the surface 43 of the nut head 44 caused by the drive nut 50. Because a positive mechanical engagement exists between the nibs 56 of the drive nut and the mating driving recess 46 of the nut there is also a complete elimination of any "jam nut effect" that exists in the previous blind fastener assemblies. The drive nut 50 is non-deformable and as a result provides consistent and predictable results. Unlike the previous blind fasteners which rely on forcibly deforming an annular ridge of the drive nut into the nut head, the drive nut 50 and nut head 44 will consistently engage as designed and not deform when the installation load increases.

Figure 5:
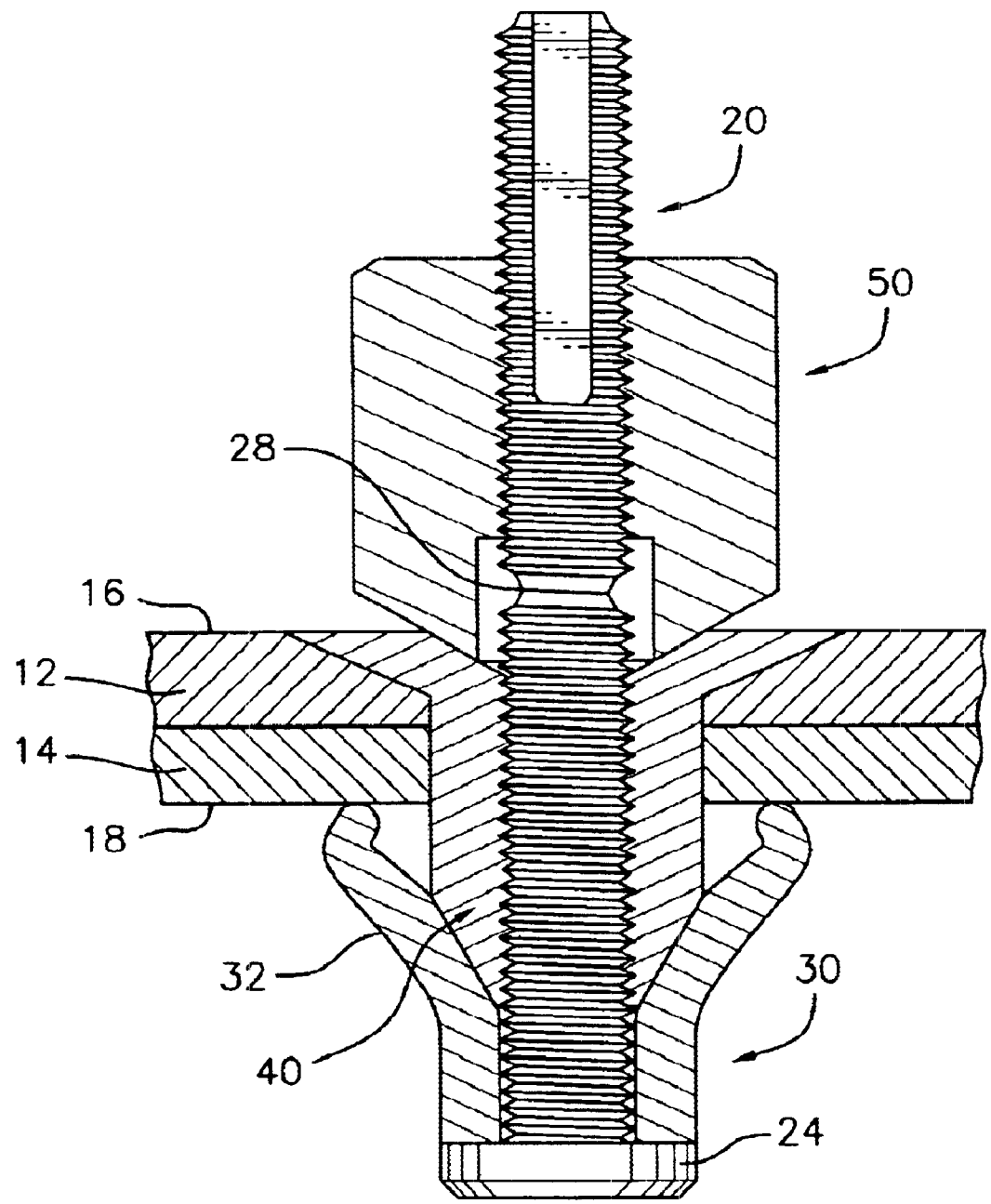
FIG. 5 is a partial cross-sectional side view of the blind fastener system of FIG. 1 showing the blind fastener during installation into a pair of sheets and the deformable sleeve has deformed.

The increased installation load applied by the installation tool results in the sleeve 30 being drawn towards the tapered nose 42 of the nut and the blind surface 18 of sheet 14. Referring to FIG. 5, because the sleeve 30 is made of a deformable material, as the internal diameter 37 presses against the tapered nose 42 the sleeve body 32 and internal diameter 37 begins to expand radially. As the sleeve body 32 adjoins the blind surface 18 of sheet 14 buckling continues on the upper portion of internal diameter 37.

Figure 6:
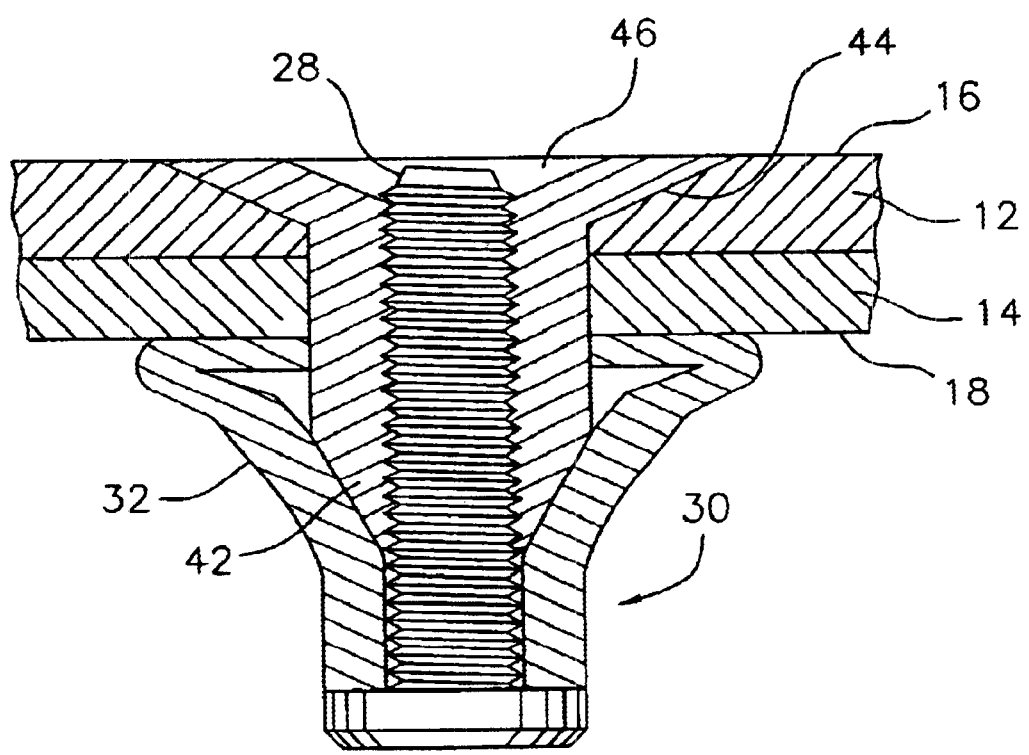
FIG. 6 is a partial cross-sectional side view of the blind fastener system of FIG. 1 showing the blind fastener after installation is complete.

At a predetermined torsional load, the sleeve 30 will have deformed and expanded to a desired diameter and the break frangible groove 28 of the screw 20 will fail in torsional shear and break away. As shown, in the preferred embodiment the break frangible groove 28 is machined in an axial position on the screw 20 so that just prior to when the frangible groove 28 breaks away, the remaining portion of the screw is substantially flush with the surface 43 of the nut head 44. Moreover, the drive nut 50 is able to break away with the portion of the screw 20 that breaks with the frangible groove 28 without any damage to the surface 43 of the nut head 44 because the nibs 56 had not deformed into the driving recess 46. As shown in FIG. 6, after installation is complete the sheets 12,14 are secured together between the nut head 44 and the deformable sleeve 30.

Figure 11:
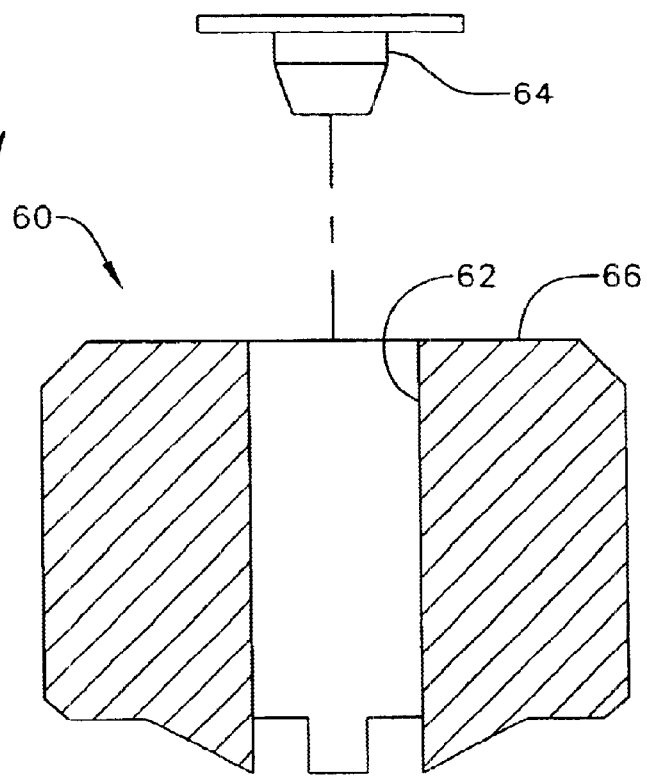
FIG. 11 is a cross-sectional view of a second alternative embodiment drive nut and retaining device.

FIG. 11 illustrates a second alternative embodiment drive nut 60 for use with the blind bolt assembly of the present invention. Drive nut 60 is identical to drive nut 50 with the exception of a smooth internal bore 62. Considering drive nut 60 does not have internal threads the drive nut is held onto screw 22 by a retaining device 64. Device 64 can be an O-ring, a retaining ring or a plug which is placed over screw 62 against the back surface 66 of drive nut 60. Alternatively drive nut 66 could be held onto pin 22 by applying an adhesive between smooth bore 62 and the external threads of screw 22.

Figure 12:
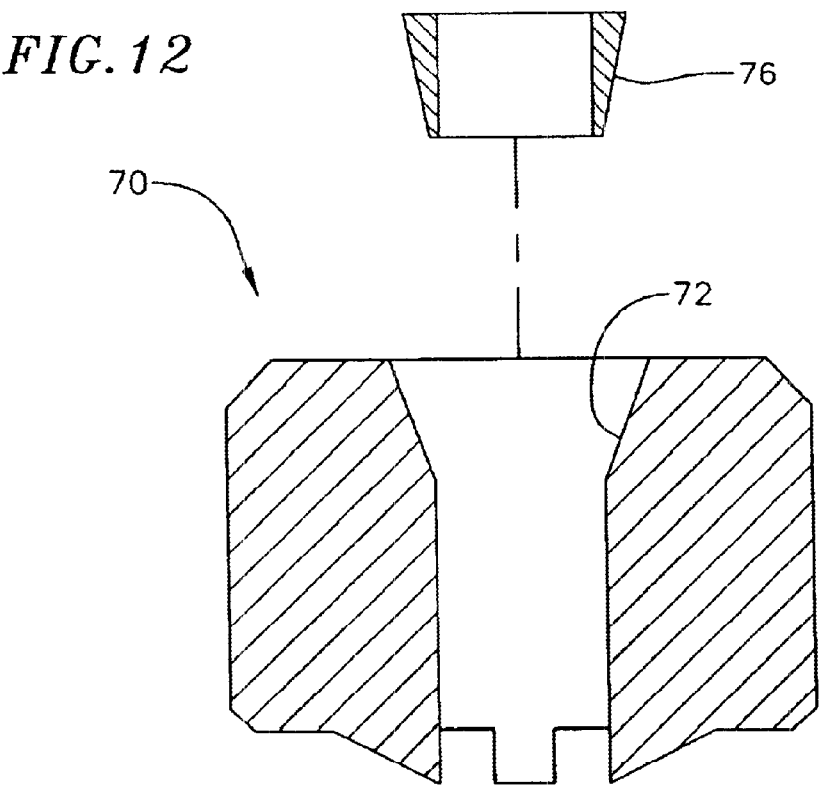
FIG. 12 is a cross-sectional view of a third alternative embodiment drive nut and retaining device.

FIG. 12 shows another alternative embodiment drive nut 70 which also has a smooth internal bore 72 which has a tapered section 74 and is retained on screw 22 by a tapered insert 76. Typically tapered insert 76 would be made of nylon or any other suitable material. A drive nut with a smooth bore eliminates the need to thread the drive nut onto screw 22 for engagement of the nibs into the recesses of the nut. This reduces dramatically the installation time of the placement of the drive nut into its proper position. Once the drive nut is slid into position, it must be retained until the user begins the final installation process. As mentioned, devices such as a retaining ring, O-ring, plugs or tapered inserts that nest in a mating tapered hole in the backside of the drive nut can be used. The tapered insert provides a stronger resistance to pull out because of the locking taper design and the higher the removal loads the tighter it becomes. The tapered polymer insert is the preferred retaining device. As previously mentioned, alternatively a drop or two of any suitable adhesive can be placed into the smooth bore to bond the drive nut to the screw.

The assembly method of the drive nuts of FIGS. 11 and 12 begins with the sleeve being placed over the threads of the screw and set adjacent to the head of the screw. The nut is then rotated onto the screw until it is adjacent the sleeve. The partial assembly of the screw, the sleeve and the nut is positioned for the dimpling process on the grip section of the nut. This process is a physical deformation of a small portion of the nut wall thickness that displaces nut material against the internal screw to cause sufficient friction to prevent loosening. The drive nut with the smooth bore is slid over the male threads of the screw and the protruding nibs are aligned and physically engaged into the mating recesses in the head of the nut. Once the drive nut is in position with the mating recess of the nut, the retaining device is placed over the screw adjacent the back surface of the drive nut. If an adhesive is used in lieu of the retaining device, after the drive nut is placed over the screw and the nibs engage the recesses in the nut, adhesive is applied into the bore to bond the drive nut to the screw.

Figure 13:
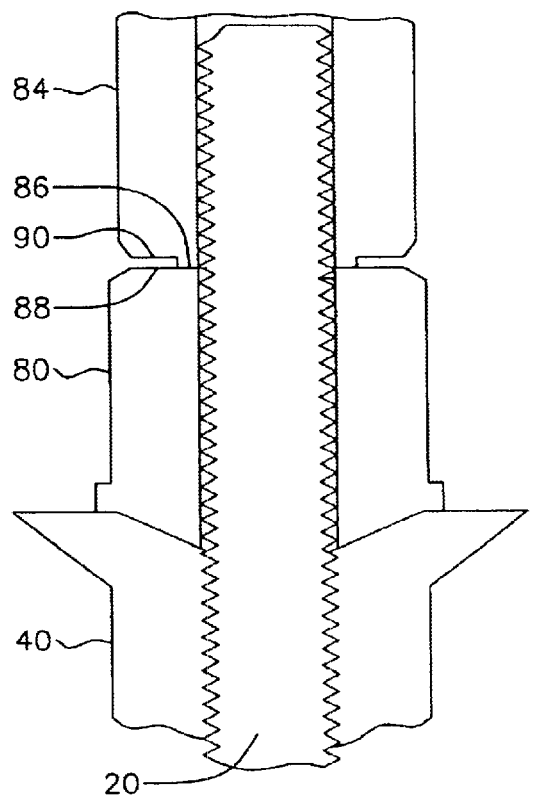
FIG. 13 is a cross-sectional view of a fourth alternative embodiment drive nut prior to end staking.
Figure 14:
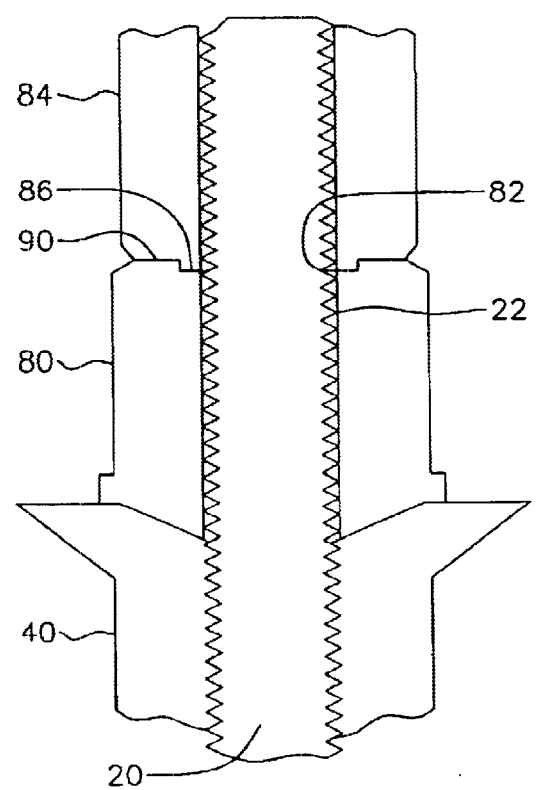
FIG. 14 is a cross-sectional view of the drive nut of FIG. 13 after being end staked.

FIGS. 13 and 14 illustrate yet another alternative embodiment drive nut 80 of the present invention. The drive nut 80 is constructed identically to drive nut 60 shown in FIG. 11. In this embodiment, however, the drive nut utilizes a method that captivates a portion of the drive nut that is away from the head of the nut body to the screw. Specifically, the attachment method incorporates a slight deformation 82 of the drive nut material to lock the drive nut to the threaded portion 22 of the screw 20. The deformation is formed by first sliding the drive nut 80 into mating recess with the head of the screw. A hollow mandrel 84 having a smaller diameter nosepiece 86 is forcibly pressed against an end portion 88 of the drive nut wherein enough axial pressure is induced to cause the nosepiece of the hollow mandrel to mechanically displace, commonly known as staking, material from the drive nut radially inward against the threads 22 of the screw 20. The bottom surface 90 of the hollow mandrel acts as a stop to consistently limit the amount of deformation material 82. Once the deformation action is completed the hollow mandrel is removed and the assembly of the blind fastener is complete.

During installation of the blind bolt into the work pieces, the drive nut holds the nut from rotation while the screw is rotated. As this installation process continues, the rotating screw reforms the deformed material 82 exactly to the shape of the threads 22 of the screw 20.

The nosepiece 86 of the mandrel can take many geometrical forms, however the preferred form is a flat annular protuberance of a fixed dimension. The exact geometrical configuration of the nosepiece will dictate the geometrical configuration of the deformation in the end of the drive nut which mates with the threads on the screw. Likewise the deformed material 82 can take various geometrical forms.

Figure 15:
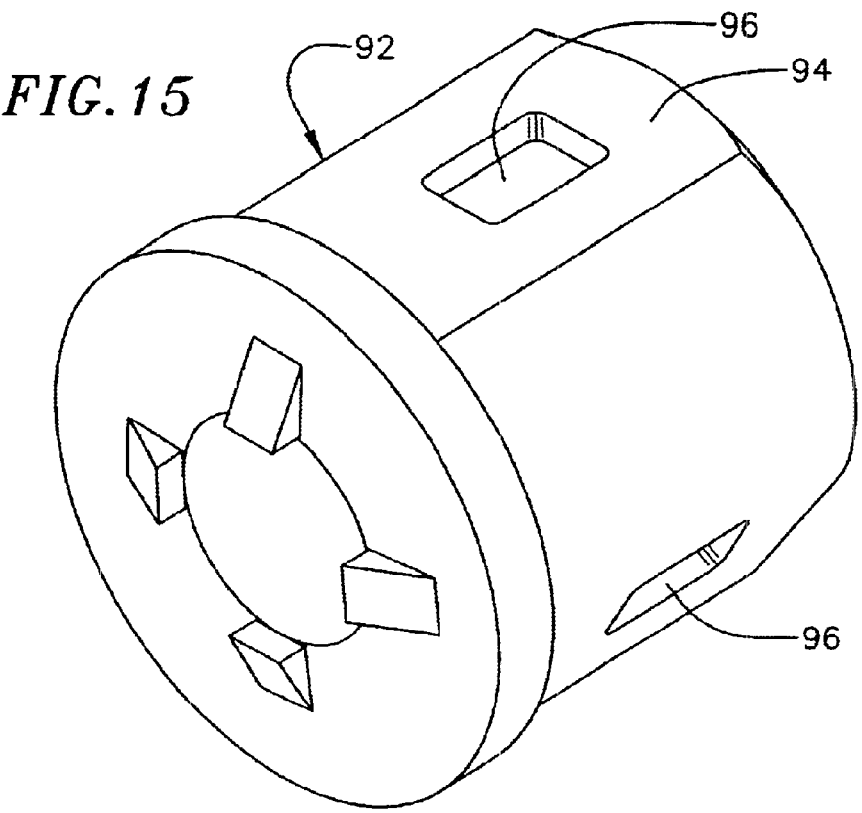
FIG. 15 is a perspective view of a fifth alternative embodiment after side staking.
Figure 16:
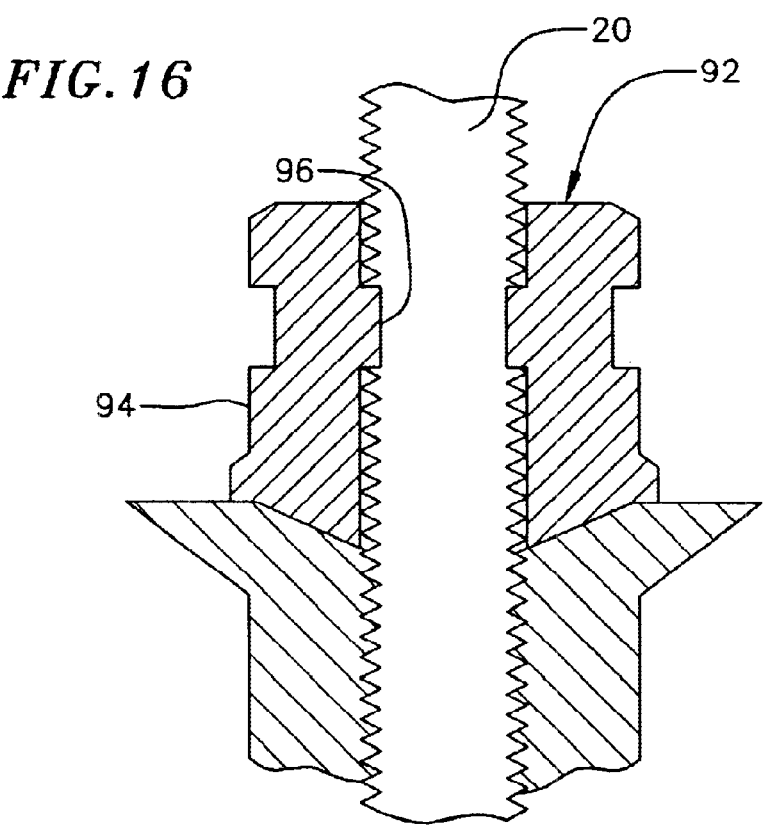
FIG. 16 is a cross-sectional view of the drive nut of FIG. 15.

FIGS. 15 and 16 illustrate yet another alternative embodiment drive nut 92 of the present invention. The drive nut 90 is constructed identically to drive nut 60 shown in FIG. 11. In this embodiment, however, the drive nut utilizes a method that captivates a portion or portions of the drive nut along the side 94 of the drive nut to the screw 20. In this method, a number of speciality configured portions 96 of the drive cap are staked in a 90° direction to the axis if the screw 20 from a side surface 94 of the drive cap. These deformed portions which are directed 90° to the axis of the screw produce a similar deformation inside the through hole in the drive nut displacing material onto and around the threads of the screw. Any number of deformed portions 96 can be spaced around the circumference of the drive nut thereby causing the drive nut to be sufficiently retained to the screw without causing damage to the overall fastener. The deformations can be formed by any suitable manufacturing process, commonly by a punch or a die. Although the deformed portions 96 are shown as rectangular, any geometrical pattern can be used, such as for example squares, diamonds, triangles or circles.

Although the present invention has been described and illustrated in various embodiments thereof, it is to be understood that changes and modifications can be made therein which are within the full intended scope of the invention as herein after claimed.

What is claimed is:

1. A blind fastener assembly comprising:

a screw having a plurality of external threads and a head positioned at an end of the screw;

a sleeve having a deformable sleeve face positioned at the end of the screw adjacent the head;

a nut having a plurality of internal threads, an enlarged nut head positioned at an end of the nut, and a driving recess positioned within the enlarged nut head, wherein an end opposite the nut head is positioned on the screw adjacent to the sleeve; and a drive nut having a smooth bore positioned on the screw adjacent the nut having an outer surface adapted for engagement by a driving tool, a plurality of protruding nibs extending from a first end of the drive nut for engaging the driving recess of the nut and at least one protrusion extending into the smooth bore from the outer surface of the drive nut for engaging the threads of the screw.

2. The blind fastener assembly of claim 1 wherein there are a plurality of protrusions extending into the smooth bore of the drive nut.

3. The blind fastener assembly according to claim 2 wherein there are four protrusions.

4. The blind fastener assembly according to claim 1 wherein the protrusions are geometrically shaped.

5. The blind fastener assembly according to claim 1 wherein at least one of the nibs of the drive nut has a rectangular configuration and the drive nut and the nut are made from a non-deformable material.

6. A method for assembling a fastener system comprising the steps of:

threading a sleeve onto a screw;

threading a nut having a plurality of internal threads and a head having a driving recess onto the screw adjacent the sleeve;

positioning a drive nut having a smooth bore and a plurality of protruding nibs extending from a first end of the drive nut onto the nut so that the protruding nibs are aligned and matingly engaged into the driving recess of the nut; and deforming a side portion of the drive nut into the smooth bore to engage and retain the drive nut on the screw.

7. The method of claim 6 wherein the step of deforming comprises displacing a portion of the drive nut into threads on the screw at a 90° angle with an axial axis of the screw.

8. The method of claim 6 wherein a plurality of side portions are displaced into the smooth bore to engage the screw.

* * * * *